United States Patent [19]

Smith et al.

[11] Patent Number: 4,817,207
[45] Date of Patent: Mar. 28, 1989

[54] OPTICAL COMMUNICATION SYSTEM UTILIZING PHASE MODULATION

[75] Inventors: David W. Smith; Roderick P. Webb, both of Woodbridge, United Kingdom

[73] Assignee: British Telecommunications plc, London, United Kingdom

[21] Appl. No.: 14,049

[22] PCT Filed: Jun. 18, 1986

[86] PCT No.: PCT/GB86/00353
   § 371 Date: Feb. 18, 1987
   § 102(e) Date: Feb. 18, 1987.

[87] PCT Pub. No.: WO86/07657
   PCT Pub. Date: Dec. 31, 1986

[30] Foreign Application Priority Data

Jun. 19, 1985 [GB] United Kingdom ........ 8515500
Jun. 19, 1985 [GB] United Kingdom ........ 8515583

[51] Int. Cl.$^4$ ............................ H04B 9/00
[52] U.S. Cl. .................. 455/617; 455/615
[58] Field of Search .......... 455/606, 607, 612, 615, 455/616, 617, 618, 619, 600, 605, 608, 611

[56] References Cited

U.S. PATENT DOCUMENTS

| | | | |
|---|---|---|---|
| 3,691,387 | 9/1972 | DeLange | 455/608 |
| 4,079,415 | 3/1978 | Will | 455/3 |
| 4,436,376 | 3/1984 | Fergason | 455/617 |
| 4,674,105 | 6/1987 | Suzuki | 375/83 |
| 4,761,798 | 8/1988 | Griswold, Jr. et al. | 375/59 |

FOREIGN PATENT DOCUMENTS 60-263926 12/1985 Japan.

OTHER PUBLICATIONS

Electronic Letters, 11-22-84, vol. 20#24, "Novel Optical FSK Heterodyne Single Filter Detection System using a Directly Modulated DFB Laser Diode", Emura et al., pp. 1022-1023.

Electronics Letters, vol. 19, No. 14, 7/7/83, (London, GB), R. Wyatt et al.: "1-52 mum PSK heterodyne experiment featuring an external cavity diode laser local oscillator", pp. 550-552, see FIG. 1.

Optics and Spectroscopy, vol. 17, No. 1, 7/1964, (N.Y.), N. B. Kravtsov et al.: "On the possibility of converting phase and frequency modulation of light into amplitude modulation", p. 74, see left-hand col. lines 1-7.

IEEE transactions on Communication Technology, vol. COM-19, No. 3, Jun. 1971, (IEEE N.Y.), R. F. Pawula: "The effects of quadratic AM-PM conversion in frequency-division multiplexed multiple-access communication satellite systems", pp. 345-349.

Primary Examiner—Robert L. Griffin
Assistant Examiner—L. Van Beek
Attorney, Agent, or Firm—Nixon & Vanderhye

[57] ABSTRACT

An optical communication system is disclosed comprising a transmission assembly including a semiconductor laser amplifier. The laser amplifier superimposes onto an amplitude modulated signal a phase modulation corresponding to the amplitude modulation. The optical communication system may further include a separation device for filtering out the amplitude modulation. A receiving assembly is provided for detecting the phase modulation of a transmitted signal.

14 Claims, 2 Drawing Sheets

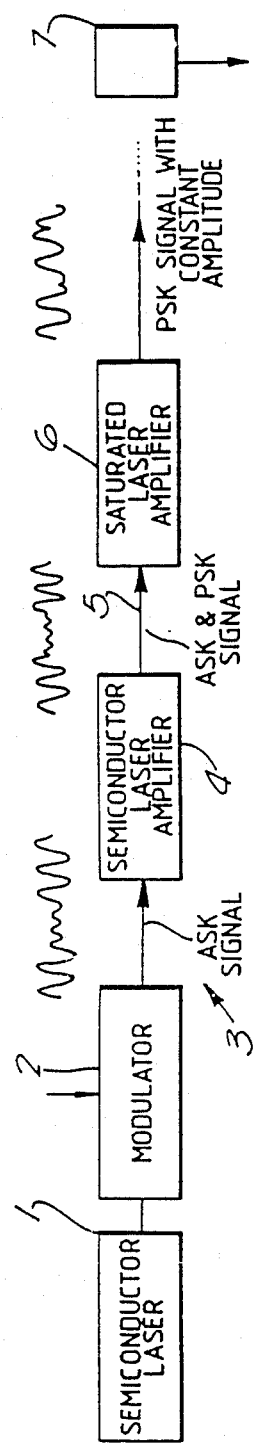
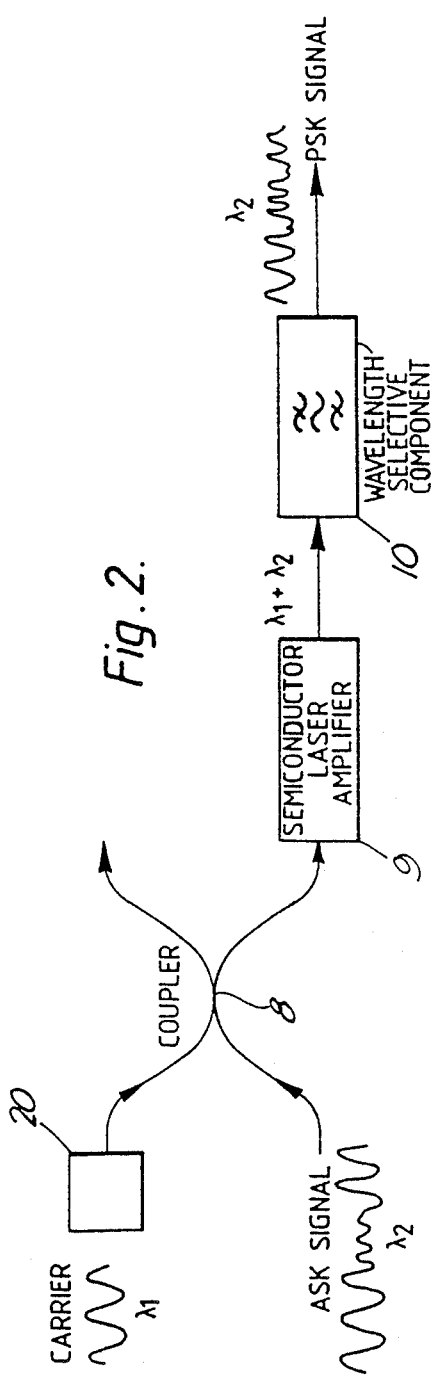

OPTICAL COMMUNICATION SYSTEM UTILIZING PHASE MODULATION

FIELD OF THE INVENTION

The invention relates to a transmission assembly and to an optical communication system comprising a transmission assembly and a receiving assembly between which optical signals which have been modulated in accordance with information are communicated. Such communication may be for example via optical waveguides such as optical fibres or via satellite communication and the like.

BACKGROUND AND SUMMARY OF THE INVENTION

In this specification, the term optical is intended to refer to that part of the electromagnetic spectrum which is generally known as the visible region together with those parts of the infra-red and ultra-violet regions at each end of the visible region which are capable of being transmitted by dielectric optical waveguides such as optical fibres.

Commonly, the amplitude of an optical carrier signal is modulated in accordance with information to be transmitted. It is preferable, however, in certain applications for example coherent systems for this information to be transmitted as a phase modulation of a carrier signal.

In accordance with one aspect of the the present invention, an optical communication system comprises a transmission assembly including a conversion device to which an optical signal whose amplitude is modulated in accordance with information is fed, the conversion device being responsive to the power of the amplitude modulated optical signal to produce an optical output signal whose phase is modulated in correspondence with the amplitude moduation of the incoming signal; and a receiving assembly for detecting the phase modulation to regenerate the information.

In the simplest example, the conversion device superimposes a phase modulation on the incoming amplitude modulated signal. In this case, the signal produced will be both and amplitude and phase modulated. Conveniently, therefore, the transmission assembly further comprises separation means for receiving the output signal from the conversion device and for producing a solely phase modulated signal. An example of a suitable separation means is provided by a saturated laser amplifier.

The amplitude modulated optical carrier signal may be generated in any conventional manner before being fed to the transmission assembly.

In accordance with a second aspect of the present invention, a transmission assembly comprises a conversion device for receiving an amplitude modulated optical signal and for producing an optical output signal whose phase is modulated in correspondence with the amplitude moduation of the incoming signal; an auxiliary optical signal source; and feed means for feeding signals from the auxiliary source to the conversion device.

In one arrangement, the signal generated by the auxiliary source comprises a carrier signal, the feed means comprising an optical coupling device having an input port connected to the auxiliary source and an output port connected with the conversion device.

In this arrangement the auxiliary signal is phase modulated by the amplitude modulated signal.

In another arrangement, the feed means comprises an optical coupling device having a pair of input ports one of which is connected to the auxiliary source and the other of which receives a modulated optical signal, and an output port connected to the conversion device whereby the signal from the auxiliary source is combined in use with the modulated optical signal to produce an amplitude modulated signal.

In this arrangement, the transmission assembly can act as a repeater to amplify the incoming signal. Furthermore, it allows a phase modulated signal to be amplified.

Preferably, the conversion device comprises an optical device having a refractive index which varies in accordance with the power of the amplitude modulated optical signal. An example of such an optical device is provided by a semiconductor laser amplifier.

BRIEF DESCRIPTION OF THE DRAWINGS

Some examples of optical communication systems and transmission assemblies in accordance with the present invention will now be described with reference to the accompanying drawings, in which:

FIG. 1 illustrates in block diagram form one example of an optical communication system and transmission assembly; and, FIG. 2 to 5 illustrate four further examples of transmission assemblies.

DETAILED DESCRIPTION

Figure 3:
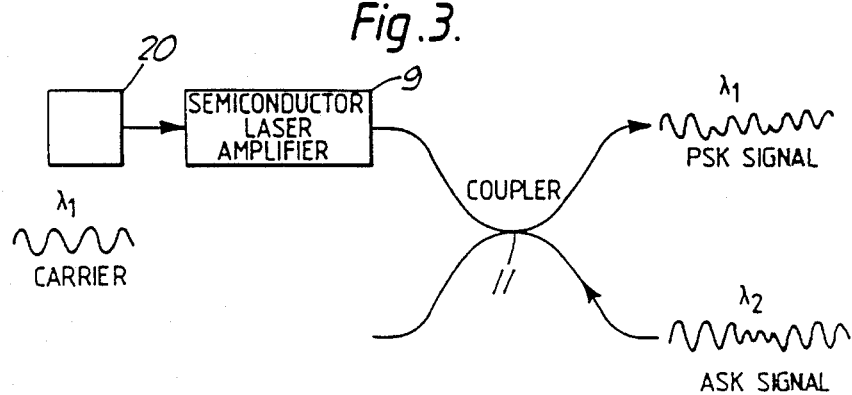

The optical communication system shown in FIG. 1 comprises a semiconductor laser 1 for generating an optical carrier signal having a constant phase and amplitude which is fed to a conventional amplitude modulator 2. The modulator 2 modulates the amplitude of the incoming carrier signal in response to information such as data and generates an amplitude modulated signal which is fed along an optical waveguide such as monomode optical fiber, to a transmission assembly 3.

The assembly 3 includes a semiconductor laser amplifier 4. The laser amplifier 4 exhibits certain optical non-lineararities with incident light power. These include changes in gain in accordance with incident light and changes in refractive index. This latter variation causes changes in optical path length through the amplifier, and hence the signal transit time. The result of this latter non-linearity is that an amplitude modulated light input signal will have a phase modulation superimposed on it which corresponds to the input amplitude modulation. Thus, the signal produced by the laser amplifier 4 will have an additional phase modulation corresponding to the original amplitude modulation. This combined signal is fed along an optical fibre 5 to a saturated laser amplifier 6. The saturated laser amplifier 6 removes the amplitude modulation so that the resultant output signal retains only the phase modulation. This resultant signal is then fed in any conventional manner to a conventional receiving assembly 7 which demodulates the incoming signal to regenerate the original information.

In the remaining examples, only the transmission assembly is illustrated.

The transmission assembly shown in FIG. 2 comprises an optical fibre coupler 8 having one output arm connected to a semiconductor laser amplifier 9. The two input arms of the coupler 8 receive respectively an optical carrier signal with a constant amplitude and phase having a wavelength $\lambda_1$ from, for example, a stable, narrow-linewidth auxiliary source 20 and an amplitude modulated signal having a wavelength $\lambda_2$. These signals are combined by the coupler 8 and the combined signal is fed to the amplifier 9. In the amplifier 9, the carrier signal is phase modulated by the amplitude modulated signal which causes changes in optical path length through the amplifier so that the signals output from the laser amplifier 9 comprise a phase modulated carrier signal with wavelength $\lambda_1$ and the amplitude modulated signal $\lambda_2$. These signals are fed to a wavelength selector 10 of conventional form which filters out the wavelength $\lambda_2$ to leave only the wavelength $\lambda_1$ which is the phase modulated carrier signal. This ability to transfer modulation from one wavelength to another is particularly valuable in wavelength multiplex systems.

An alternative arrangement to that shown in FIG. 2 is illustrated in FIG. 3. In this case, the carrier signal $\lambda_1$ is injected directly into the laser amplifier 9. The amplitude modulated signal $\lambda_2$, however, is injected via a coupler 11 in an opposite direction into the laser amplifier 9. The advantage of this arrangement is that the resultant phase modulated carrier $\lambda_1$ has only a very small amplitude modulated component which does not need to be filtered out.

Figure 4:
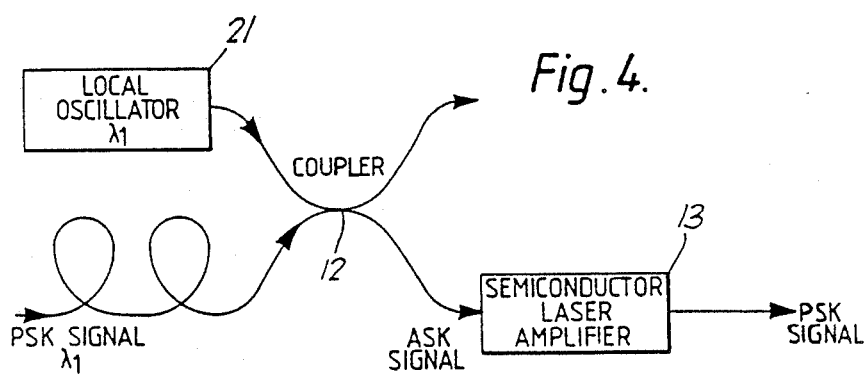

FIG. 4 illustrates a homodyne/laser amplifier PSK repeater. An incoming phase modulated signal with wavelength $\lambda_1$ is fed to an optical coupler 12 together with a homodyne optical signal having a wavelength $\lambda_1$ from an auxiliary source 21. When combined, a resultant amplitude modulated signal will be produced with the amplitude modulation corresponding to the original phase modulation. This amplitude modulated signal is fed to a semiconductor laser amplifier 13, as before, to regenerate the original phase modulation. Such a repeater would have gain from both the coherent mixing process and the amplifier and involve no electronic processing of the signal.

Figure 5:
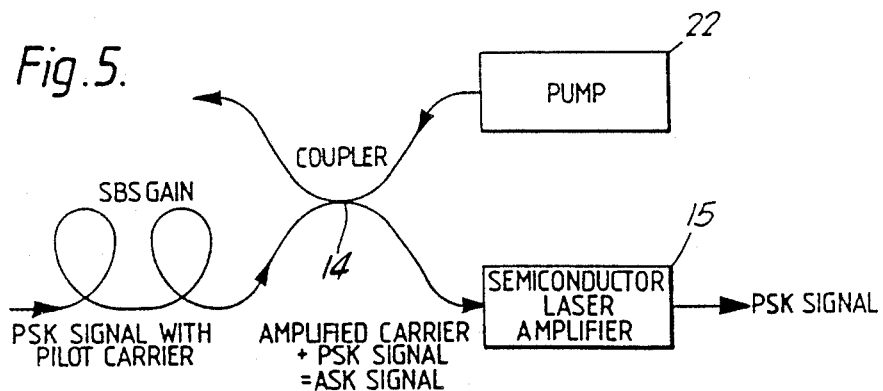

Another example of a PSK repeater is illustrated in FIG. 5. In this example, a narrow-band amplification process, such as stimulated Brillouin scattering, is used to amplify a pilot carrier in a weak PSK signal. The PSK signal with pilot carrier is fed to an optical coupler 14 while a pump signal from an auxiliary source 22 is injected into the coupler 14 in an opposite direction. The amplified carrier signal together with the phase modulated signal produces an amplitude modulated signal which is fed to a semiconductor laser amplifier 15. The amplifier 15 then converts the demodulated signal to a phase modulated signal, as before.

We claim:

1. An optical communication system comprising a transmission assembly including modulation means coupled to a source of an optical signal for amplitude modulating said optical signal in accordance with input information to generate an amplitude modulated optical signal which is optically coupled to a conversion means so that the amplitude modulated optical signal passes through the conversion means, said conversion means being responsive to the power of said amplitude modulated optical signal to produce an optical output signal whose phase is modulated in correspondence with the amplitude modulation of said amplitude modulated optical signal; and a receiving assembly for detecting the phase modulation to regenerate the input information.

2. A system according to claim 1, wherein the transmission assembly further comprises separation means for receiving the output signal from the conversion means and for producing a solely phase modulated signal.

3. A system according to claim 1 or claim 2, wherein the conversion means comprises an optical device having a refractive index which varies in accordance with the power of the amplitude modulated optical signal passing through said conversion means.

4. A system according to claim 3, wherein the optical device comprises a semiconductor laser amplifier.

5. An optical communication system according to claim 1 or 2, wherein the transmission assembly includes an auxiliary optical signal source; and feed means for feeding signals from the auxiliary source to the conversion means.

6. A transmission assembly comprising: a first optical signal source for generating an amplitude modulated optical signal which is optically coupled to a conversion means so that the amplitude modulated optical signal passes though the conversion means, said conversion means being responsive to the power of said amplitude modulated optical signal for generating an optical output signal whose phase is modulated in correspondence with the amplitude modulation of said amplitude modulated optical signal, an auxiliary optical signal source for generating a carrier signal, and feed means kfor feeding signals from said auxilary optical signal source to said conversion means comprising an optical coupling device having an input port connected to the auxiliary source and an output port connected to said conversion means.

7. An assembly according to claim 6, wherein said feed means comprises an optical coupling device having a pair of input ports one of which is connected to the auxiliary source and the other of which receives said modulated optical signal, and an output port connected to the conversion device whereby the signal from the auxiliary source is combined in use with the modulated optical signal to produce an amplitude modulated signal.

8. In an optical communication system, a method of transmitting optical signals comprising the steps of:
amplitude modulating an optical signal in accordance with input information to generate an amplitude modulated optical signal,
optically coupling said amplitude modulated optical signal to a conversion device so that the amplitude modulated optical signal passes through said conversion device, and
generating, via said conversion device, in response to the power of said amplitude modulated optical signal, an optical output signal whose phase is modulated in correspondence with the amplitude modulation of the amplitude modulated optical signal.

9. A method according to claim 8, further comprising the step of receiving the optical output signal for producing a solely phase modulated signal.

10. A method according to claim 8 or claim 9, wherein said generating step includes utilizing as said conversion device an optical device having a refractive index which varies in accordance with the power of the amplitude modulated optical signal.

11. A method according to claim 11, wherein the optical device comprises a semiconductor laser amplifier.

12. A method according to claim 8 or 9, further including the steps of generating an auxiliary optical signal, optically coupling said auxiliary optical signal and said amplitude modulated optical signal, and generating said optical output signal in response to the coupled said auxiliary optical signal and amplitude modulated signal.

13. A transmission assembly comprising a first optical signal source for generating an amplitude modulated optical signal which is optically coupled to a conversion means so that the amplitude modulated optical signal passes through the conversion means, said conversion means being responsive to the power of said amplitude modulated optical signal for generating an optical output signal whose phase is modulated in correspondence with the amplitude modulation of said amplitude modulated optical signal, an auxiliary optical signal source, and feed means for feeding signals from said auxiliary optical signal source to said conversion means.

14. An assembly according to claim 13, wherein the feed means comprises an optical coupling device having a pair of input ports one of which is connected to the auxiliary source and the other of which receives a modulated optical signal, and an output port connected to the conversion means whereby the signal from the auxiliary source is combined with the modulated optical signal to produce an amplitude modulated signal.

* * * * *